US012036160B2

(12) United States Patent
Liu et al.

(10) Patent No.: US 12,036,160 B2
(45) Date of Patent: Jul. 16, 2024

(54) NURSING BED WITH SIDE RAILS MOVABLE BETWEEN STOWED AND DEPLOYED POSITIONS

(71) Applicant: HHC CHANGZHOU CORPORATION, Changzhou (CN)

(72) Inventors: Chih Hsiung Liu, Benoni (ZA); Hai Guo Jiang, Changzhou (CN); Kui Zhao, Changzhou (CN)

(73) Assignee: MOTOMOTION CHINA CORPORATION, Changzhou (CN)

( * ) Notice: Subject to any disclaimer, the term of this patent is extended or adjusted under 35 U.S.C. 154(b) by 0 days.

(21) Appl. No.: 17/895,282

(22) Filed: Aug. 25, 2022

(65) Prior Publication Data

US 2023/0338212 A1 Oct. 26, 2023

(30) Foreign Application Priority Data

Apr. 22, 2022 (CN) ......................... 202210425723.0
Apr. 22, 2022 (CN) ......................... 202220937305.5

(51) Int. Cl.
*A61G 7/05* (2006.01)

(52) U.S. Cl.
CPC ........ *A61G 7/0516* (2016.11); *A61G 2203/12* (2013.01)

(58) Field of Classification Search
CPC .......................... A61G 7/0516; A61G 2203/12
See application file for complete search history.

(56) References Cited

U.S. PATENT DOCUMENTS

2014/0026325 A1* 1/2014 Guthrie .............. A61G 7/05776 5/709
2017/0143566 A1* 5/2017 Elku .................... A61G 7/0506
2017/0172829 A1* 6/2017 Tessmer ............... A61G 7/0516

FOREIGN PATENT DOCUMENTS

DE 202013003315 U1 * 6/2013 ........... A47C 19/045

* cited by examiner

*Primary Examiner* — Adam C Ortiz
(74) *Attorney, Agent, or Firm* — LAW OFFICES OF STEVEN W. WEINRIEB

(57) ABSTRACT

A nursing bed comprises a bed frame, a bed platform which is disposed atop the bed frame for supporting a patient who is normally disposed in a supine position, and a pair of side rails mounted upon opposite sides of the bed platform so as to be movable between deployed or raised positions and stowed or lowered positions. The side rails are movable by a pair of linear actuators, which may be simultaneously actuated or independently actuated, and a pair of linkage systems operatively connecting the pair of side rails to opposite sides of the bed frame. When the side rails are moved to their deployed or raised positions, the side rails will be disposed at positions adjacent to the side edge portions of the bed platform so as to effectively protect bed-ridden patients by preventing them from inadvertently or unintentionally falling out of bed, and when the side rails are moved to their stowed or lowered positions, the side rails will be stowed beneath the opposite side edge portions of the bed platform so as to provide an esthetically pleasing appearance to the nursing bed as well as to in permit hospital personnel or family members to more easily approach a side of the bed, without interference with the side rails, so as to thereby easily attend to a particular need of the patient.

16 Claims, 6 Drawing Sheets

NURSING BED WITH SIDE RAILS MOVABLE BETWEEN STOWED AND DEPLOYED POSITIONS

FIELD OF THE INVENTION

The present invention relates generally to beds, and more particularly to a nursing bed having a bed platform, and a pair of side rails wherein the pair of side rails can be moved between a deployed or raised position, at which the pair of side rails protect bed-ridden patients by preventing them from inadvertently or unintentionally falling out of bed, and a stowed or lowered position wherein the side rails are disposed beneath opposite side edge portions of the bed platform such that when the pair of side rails are disposed at their stowed positions, the stowed side rails do not interfere with hospital or other personnel, or family members, from closely approaching a side of the bed platform so as to more capably attend to the needs of the patient.

BACKGROUND OF THE INVENTION

Nursing beds are of course well known as a result of their common use within private homes as well as within public hospitals or other similar institutions. Nursing beds of course comprise a bed platform upon which the patient is disposed, usually in a supine position, and some nursing beds may also have side bed rails that are operatively mounted upon opposite sides of the bed platform. Such bed side rails serve various needs with respect to bed-ridden patients, such as, for example, to protect bed-ridden patients by preventing them from inadvertently or unintentionally falling out of bed, however, since the bed rails are often fixed to the opposite side edge portions of the bed platform, they effectively prevent hospital or other personnel, or even family members, from easily approaching a side of the bed so as to thereby easily attend to a particular need of the patient, or to check vital bodily functions of the patient, such as, for example, heart rate, blood pressure, oxygen level, breathing and congestion, and the like, or to simply help the patient or give the patient something that the patient wants, such as, for example, a drink of water, for the patient's pillow to be moved so that the patient is more comfortable, and the like. Alternatively, some other types of nursing beds are provided with movable side rails, however, these are usually manually movable, which requires hospital or other facility personnel, or members of the patient's family, to move the side rails from their deployed or raised positions to the stowed or lowered positions so as to permit such people to easily approach and get close to the patient. It is further noted, however, that even when such side rails are moved to their stowed or lowered positions, they are nevertheless within vertical planes exterior to the vertical planes defined by the opposite sides of the bed platform, thereby still hindering, in some effect, hospital or other facility personnel, or family members, from closely approaching the patient lying in the nursing bed.

A need therefore exists in the art for a new and improved nursing bed. Another need exists in the art for a new and improved nursing bed wherein the side rails of the bed can be automatically moved between their deployed or raised positions and their stowed or lowered positions. Still another need exists in the art for a new and improved nursing bed wherein the side rails of the bed can be automatically moved between their deployed or raised positions and their stowed or lowered positions such that when the side rails are moved to their deployed or raised positions, the side rails can effectively protect bed-ridden patients by preventing them from inadvertently or unintentionally falling out of bed, and when the side rails are moved to their stowed or lowered positions, the side rails can permit hospital or other personnel or family members to easily approach a side of the bed so as to thereby easily attend to a particular need of the patient, or to check vital bodily functions of the patient, such as, for example, heart rate, blood pressure, oxygen level, breathing and congestion, and the like. Yet another need exists in the art for a new and improved nursing bed wherein the side rails of the bed can be automatically moved between their deployed or raised positions and their stowed or lowered positions such that when the side rails are moved to their deployed or raised positions, the side rails can effectively protect bed-ridden patients by preventing them from inadvertently or unintentionally falling out of bed, and when the side rails are moved to their stowed or lowered positions, the side rails will be stowed beneath the opposite side edge portions of the bed platform so as to in fact permit hospital or other personnel or family members to more easily and closely approach a side of the bed, without interference with the side rails, so as to thereby easily attend to a particular need of the patient, or to check vital bodily functions of the patient, such as, for example, heart rate, blood pressure, oxygen level, breathing and congestion, and the like. Yet still another need exists in the art for a new and improved nursing bed wherein the side rails of the bed can be automatically moved between their deployed or raised positions and their stowed or lowered positions such that when the side rails are moved to their deployed or raised positions, the side rails can effectively protect bed-ridden patients by preventing them from inadvertently or unintentionally falling out of bed, and when the side rails are moved to their stowed or lowered positions, the side rails can be stowed beneath the opposite side edge portions of the bed platform so as to in fact permit hospital or other personnel or family members to more easily and closely approach a side of the bed, without interference with the side rails, so as to thereby easily attend to a particular need of the patient, or to check vital bodily functions of the patient, such as, for example, heart rate, blood pressure, oxygen level, breathing and congestion, and the like, and in addition, such stowed positions can provide the nursing bed with a more esthetic appearance.

OVERALL OBJECTIVES OF THE INVENTION

An overall objective of the invention is to provide a new and improved nursing bed. Another overall objective of the invention is to provide a new and improved nursing bed wherein the side rails of the bed can be automatically moved between their deployed or raised positions and their stowed or lowered positions. Still another overall objective of the invention is to provide a new and improved nursing bed wherein the side rails of the bed can be automatically moved between their deployed or raised positions and their stowed or lowered positions such that when the side rails are moved to their deployed or raised positions, the side rails can effectively protect bed-ridden patients by preventing them from inadvertently or unintentionally falling out of bed, and when the side rails are moved to their stowed or lowered positions, the side rails can permit hospital or other personnel or family members to easily approach a side of the bed so as to thereby easily attend to a particular need of the patient, or to check vital bodily functions of the patient, such as, for example, heart rate, blood pressure, oxygen level, breathing and congestion, and the like. Yet another overall objective of the invention is to provide a new and improved nursing bed wherein the side rails of the bed can be automatically moved between their deployed or raised positions and their stowed or lowered positions such that when the side rails are moved to their deployed or raised positions, the side rails can effectively protect bed-ridden patients by preventing them from inadvertently or unintentionally falling out of bed, and when the side rails are moved to their stowed or lowered positions, the side rails will be stowed beneath the opposite side edge portions of the bed platform so as to in fact permit hospital or other personnel or family members to more easily and closely approach a side of the bed, without interference with the side rails, so as to thereby easily attend to a particular need of the patient, or to check vital bodily functions of the patient, such as, for example, heart rate, blood pressure, oxygen level, breathing and congestion, and the like. Yet still another overall objective of the present invention is to provide a new and improved nursing bed wherein the side rails of the bed can be automatically moved between their deployed or raised positions and their stowed or lowered positions such that when the side rails are moved to their deployed or raised positions, the side rails can effectively protect bed-ridden patients by preventing them from inadvertently or unintentionally falling out of bed, and when the side rails are moved to their stowed or lowered positions, the side rails will be stowed beneath the opposite side edge portions of the bed platform so as to in fact permit hospital or other personnel or family members to more easily and closely approach a side of the bed, without interference with the side rails, so as to thereby easily attend to a particular need of the patient, or to check vital bodily functions of the patient, such as, for example, heart rate, blood pressure, oxygen level, breathing and congestion, and the like, and in addition, such stowed positions will provide the nursing bed with a more esthetic appearance.

SUMMARY OF THE INVENTION

The foregoing and other objectives are achieved in accordance with the principles and teachings of the present invention by providing a new and improved nursing bed which comprises a bed frame, a bed platform which is disposed atop the bed frame and upon which the patient is normally disposed in a supine position, and a pair of side rails movably mounted upon opposite sides of the bed platform so as to be movable between deployed or raised positions and stowed or lowered positions. The side rails are movable by a pair of linear actuators, which may be simultaneously actuated or independently actuated, and a pair of linkage systems operatively connecting the pair of side rails to opposite sides of the bed frame. Accordingly, when the side rails are moved to their deployed or raised positions, the side rails will be moved into positions adjacent to the side edge portions of the bed platform so as to effectively protect bed-ridden patients by preventing them from inadvertently or unintentionally falling out of bed, and when the side rails are moved to their stowed or lowered positions, the side rails will be stowed beneath the opposite side edge portions of the bed platform so as to provide an esthetically pleasing appearance to the nursing bed as well as to in fact permit hospital or other personnel or family members to more easily approach a side of the bed, without interference with the side rails, so as to thereby easily attend to a particular need of the patient, or to check vital bodily functions of the patient, such as, for example, heart rate, blood pressure, oxygen level, breathing and congestion, and the like. The actuators, for moving the side rail members between the deployed or raised positions and the stowed or lowered positions, may be actuated by a remote control device which may be operatively connected to the actuators either by hard-wired connections or by wireless connections. Lastly, two nursing beds may be disposed in a side-by-side arrangement wherein a right side of one of the nursing beds is disposed in direct contact with a left side of the other one of the nursing beds, and while in this disposition, the outside side rails may be independently actuated so as to be moved between their deployed or raised positions and their stowed or lowered positions. In this manner, the patient may effectively be provided with a bed that has a width similar to that of a standard queen-sized bed, or that of a king-sized bed, as opposed to that of a conventional twin-sized bed, thereby affording the patient more room, freedom of movement, and comfort.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
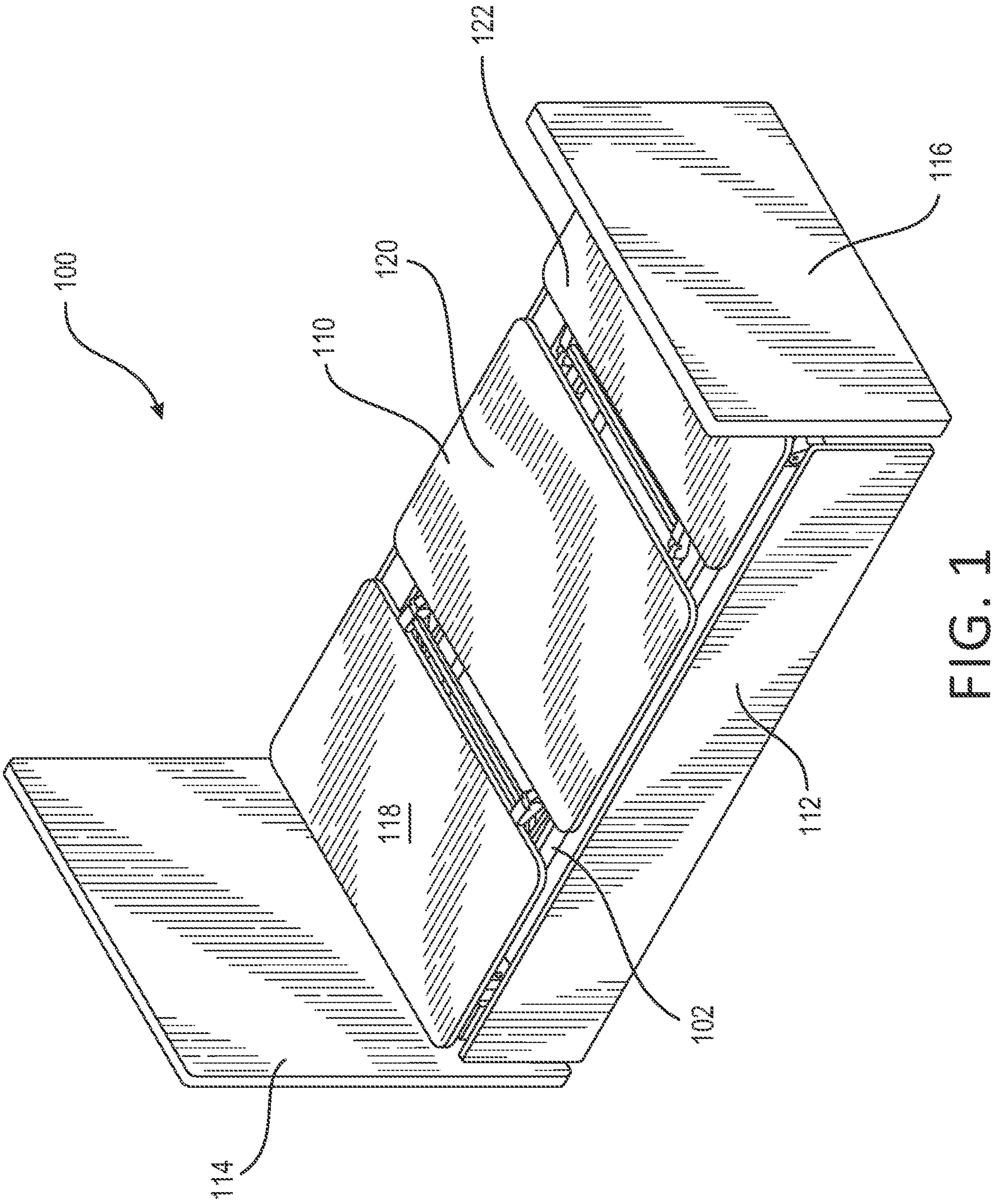
FIG. 1 is a left side perspective view of a new and improved nursing bed as constructed in accordance with the principles and teachings of the present invention and showing the movable side rails of the nursing bed disposed at their stowed or lowered position beneath the side edge frame members of the bed frame.

With reference now being made to the drawings, and more particularly to FIGS. 1-7 thereof, a new and improved nursing bed, as constructed in accordance with the principles and teachings of the present invention, is disclosed and is generally indicated by the reference character 100. More particularly, it is seen that the new and improved nursing bed 100 comprises a bed frame 102, as can best be seen in FIG. 1, and wherein, as can best be seen in FIG. 3, the bed frame 102, in turn, comprises a pair of oppositely disposed, longitudinally extending side frame members 104, only one of which is visible within FIG. 3, a head end frame member 106, and a foot end frame member 108. In addition, the nursing bed 100 also includes a bed platform 110, which is adapted to be disposed atop the bed frame 102 and upon which the patient is normally disposed in a supine position, and a pair of side rails 112, 112 which are movably mounted upon opposite sides of the bed platform 110 so as to be movable between deployed or raised positions, and stowed or lowered positions, as will be discussed in more detail hereinafter. Still yet further, the nursing bed 100 also includes a headboard 114 fixedly secured to the head end frame member 106, and a footboard 116 fixedly secured to the foot end frame member 108. It is also to be noted, as can best be appreciated from FIGS. 1-3, that the bed platform 110 comprises a back deck member 118, a seat deck member 120, and a leg deck member 122. As can be appreciated further from FIG. 3, the various deck members 118, 120, 122 can be fixed in place, or movable by suitable actuators, not shown, so as to render the patient more comfortable as may be desired or required. A plurality of support legs 124 are fixedly secured to undersurface portions of the head and foot end frame members 106, 108 such that the plurality of support legs 124 are effectively disposed at the four corner regions of the bed frame 102. A transversely disposed cross-member, not visible, is fixedly secured between the two rear support legs 124, while a transversely disposed cross-member 126 is likewise fixedly secured between the two front support legs 124 such that the transversely disposed cross-members 126 provide the bed frame 102 with enhanced rigidity and stability. Still further, and lastly, the headboard 114 and the footboard 116 are respectively fixedly secured to the two laterally spaced, rear support legs 124 and the two laterally spaced, forward support legs 124.

With reference now being made to FIGS. 3-7, a detailed disclosure of the oppositely disposed side rails 112, 112, as operatively connected to each one of the side rails 112, 112, as well as the control mechanisms for moving each one of the side rails 112, 112 between the deployed or raised positions and the stowed or lowered positions upon the new and improved nursing bed 100, will now be described. More particularly, and as can best be appreciated from, and as seen in FIGS. 4-7, each one of the side rails 112 has a pair of linkage systems 128, 128 connected thereto at forward and rearward positions, and the pair of linkage systems 128, 128 are operatively connected together by a longitudinally extending synchronization bar 130 so as to ensure that both the forward and rearward linkage systems 128, 128 are being operated simultaneously or in unison. In accordance with the principles and teachings of the present invention, and as can best be appreciated from FIG. 5, it is further seen that each one of the linkage systems 128 comprises a first mounting plate or block 132 which is adapted to be fixedly mounted upon the interior surface 134 of the side rail 112, and a first angle iron 136 which is fixedly mounted upon, or integrally formed with, the first mounting plate or block 132. In a similar manner, it is seen that each one of the linkage systems 128 further comprises a second mounting plate or block 138 which is adapted to be fixedly mounted upon an exterior surface portion of the longitudinally extending left side frame member 104, and a second angle iron 140 which is fixedly mounted upon, or integrally formed with, the second mounting plate or block 138. It is to be appreciated that the linkage systems utilized in conjunction with the right side rail 112 will have corresponding structures.

Figure 3:
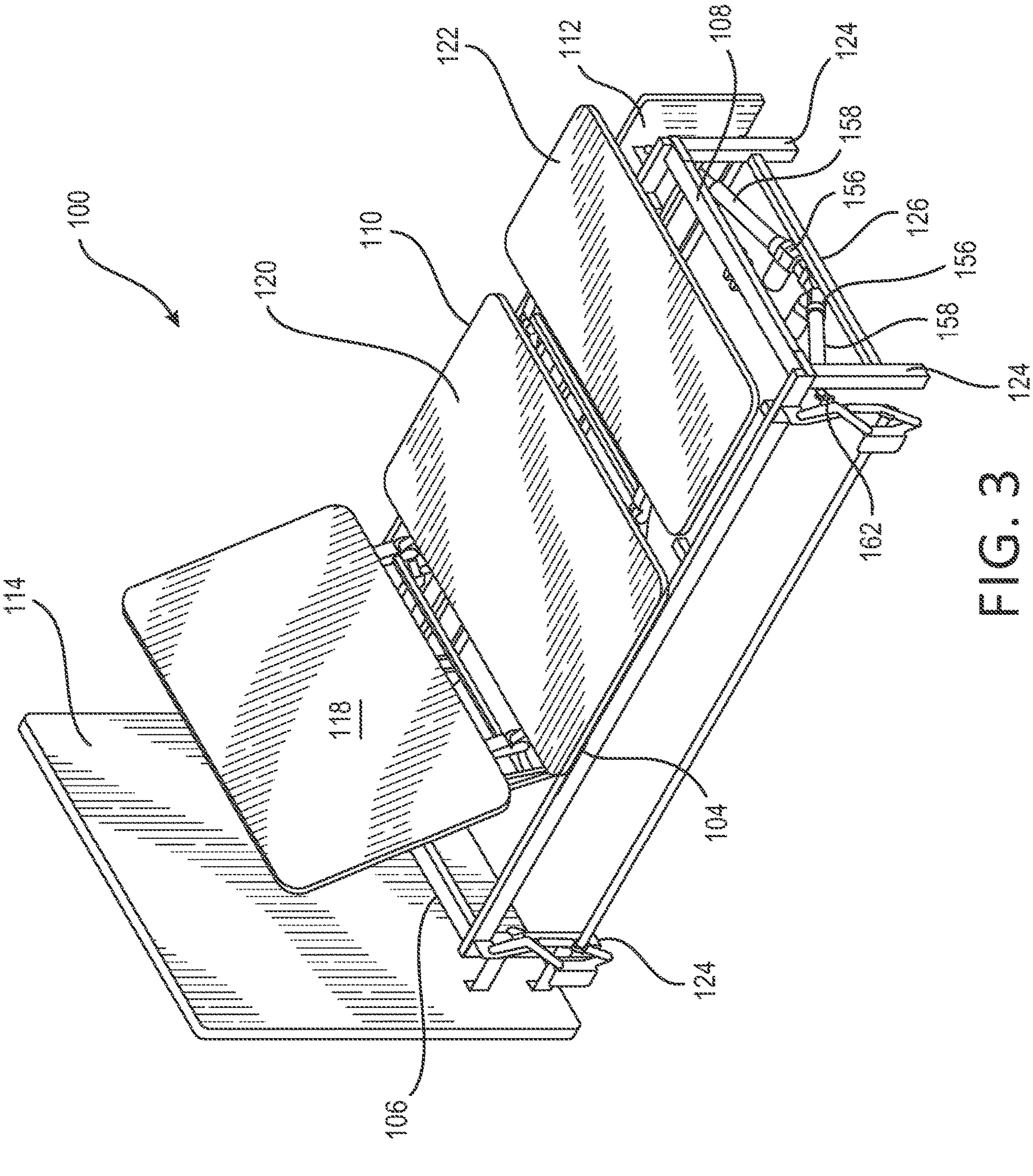
FIG. 3 is a left side perspective view of the new and improved nursing as disclosed within FIG. 1 wherein, however, the footboard and one side rail of the bed have been removed so as to clearly illustrate the linkage systems for connecting the side rails to the bed frame, as well as the actuators for moving the linkage systems, which, in turn, move the side rail members between their deployed or raised positions and the stowed or lowered positions.
Figure 5:
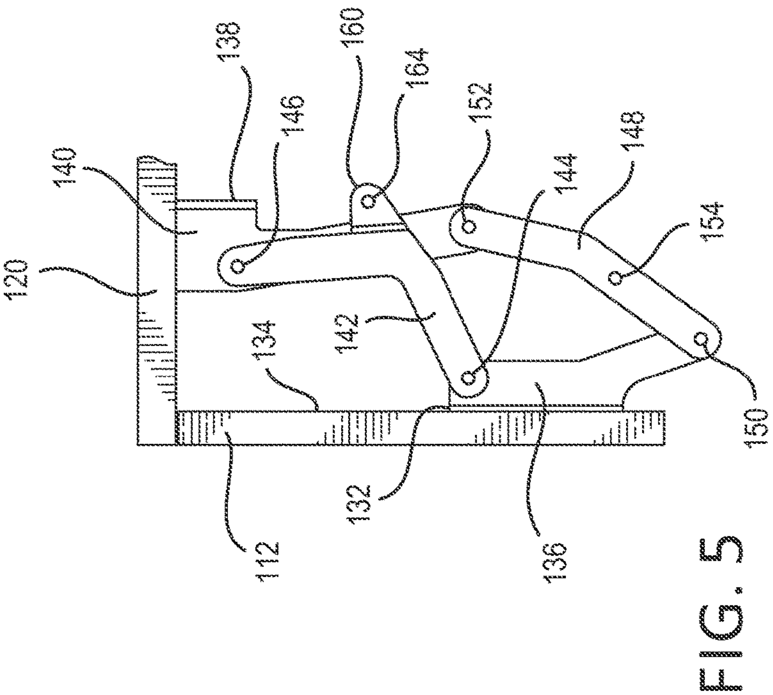
FIG. 5 is an enlarged front elevational view of the left linkage system, as illustrated within FIG. 4, showing in detail how the left linkage system is mounted upon the interior surface of the left side rail wherein the left side rail is shown as having been moved to the stowed or lowered position beneath the left side edge portion of the bed platform.
Figure 4:
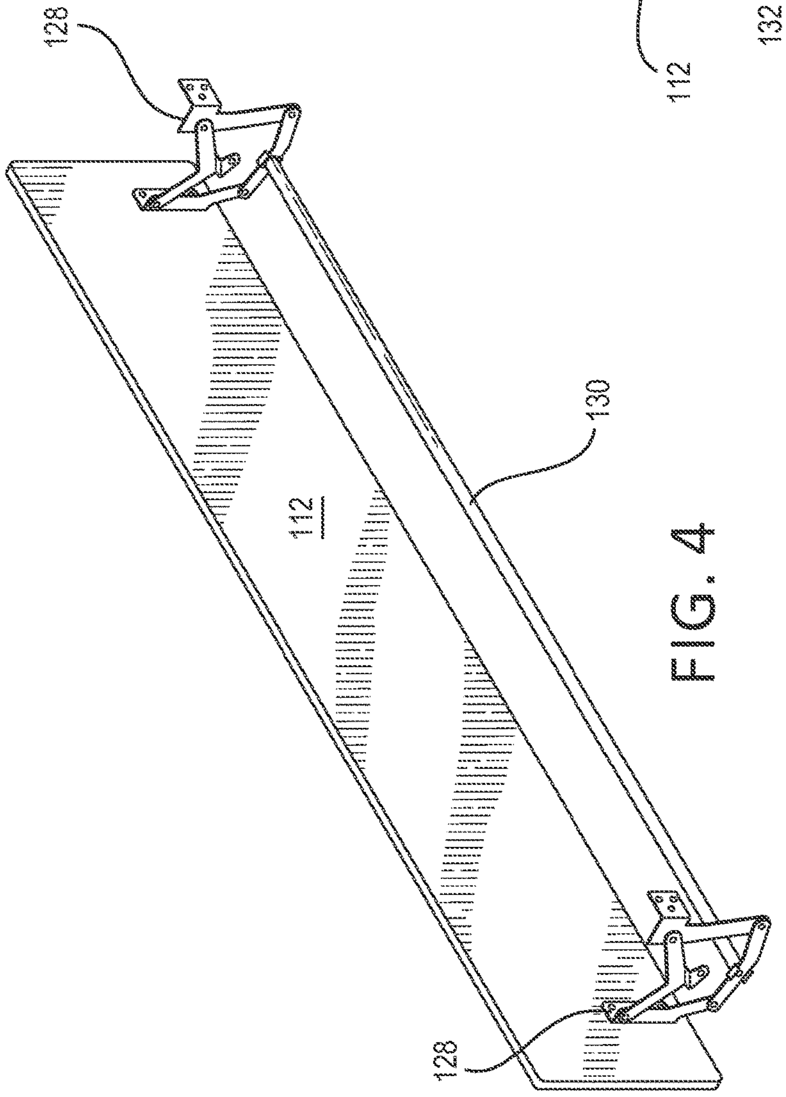
FIG. 4 is a perspective view showing one of the linkage systems as mounted upon the interior surface of the left side rail, and wherein the left side rail has been moved to a position intermediate that of the deployed or raised position and the stowed or lowered position.
Figure 7:
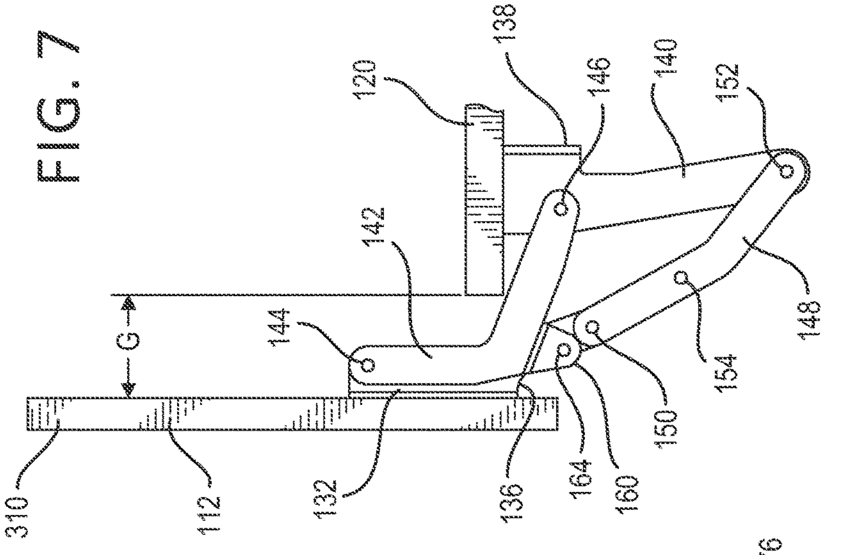
FIG. 7 is an enlarged front elevational view of the left linkage system, as illustrated within FIGS. 4-6, showing how the left linkage system is mounted upon the interior surface of the left side rail wherein the left side rail is shown as having been moved to the deployed or raised position.

Continuing further, it is seen that a first linkage member 142, having a substantially right-angled configuration, has a first end thereof pivotally connected to an upper end portion of the first angle iron 136 as at 144, while a second end thereof is pivotally connected to an upper end portion of the second angle iron 140 as at 146. In addition, a second linkage member 148, having a substantially boomerang-shaped configuration, has a first end thereof pivotally connected to a lower end portion of the first angle iron 136 as at 150, while a second end thereof is pivotally connected to a lower end portion of the second angle iron 140 as at 152. It is to be noted at this juncture that the opposite ends of the longitudinally extending synchronization bar 130 are pivotally connected to a substantially central portion of the second linkage member 148 as at 154. Reverting back to FIG. 3, in order to move the side rails 112, 112 between their deployed or raised positions and their stowed or lowered positions, a pair of linear actuators are provided at one or both ends of the bed frame 102, that is, at the foot end of the bed frame 102, as well as at the head end of the bed frame 102. As shown in FIG. 3, a pair of linear actuators are disposed at the foot end of the bed frame 102 and are seen to comprise a pair of oppositely oriented motor drives 156, 156, which are mounted upon the transversely disposed cross-member 126, and a pair of telescopic rods 158, 158. Reverting back to FIG. 5, each one of the first linkage members 142 is provided with an ear 160 to which the free or distal end portions 162, as seen in FIG. 3, of the telescopic rods 158, 158 are pivotally connected as at 164. It is to be noted that the linear actuators may be simultaneously actuated or independently actuated for reasons that will be discussed more fully hereinafter.

Figure 2:
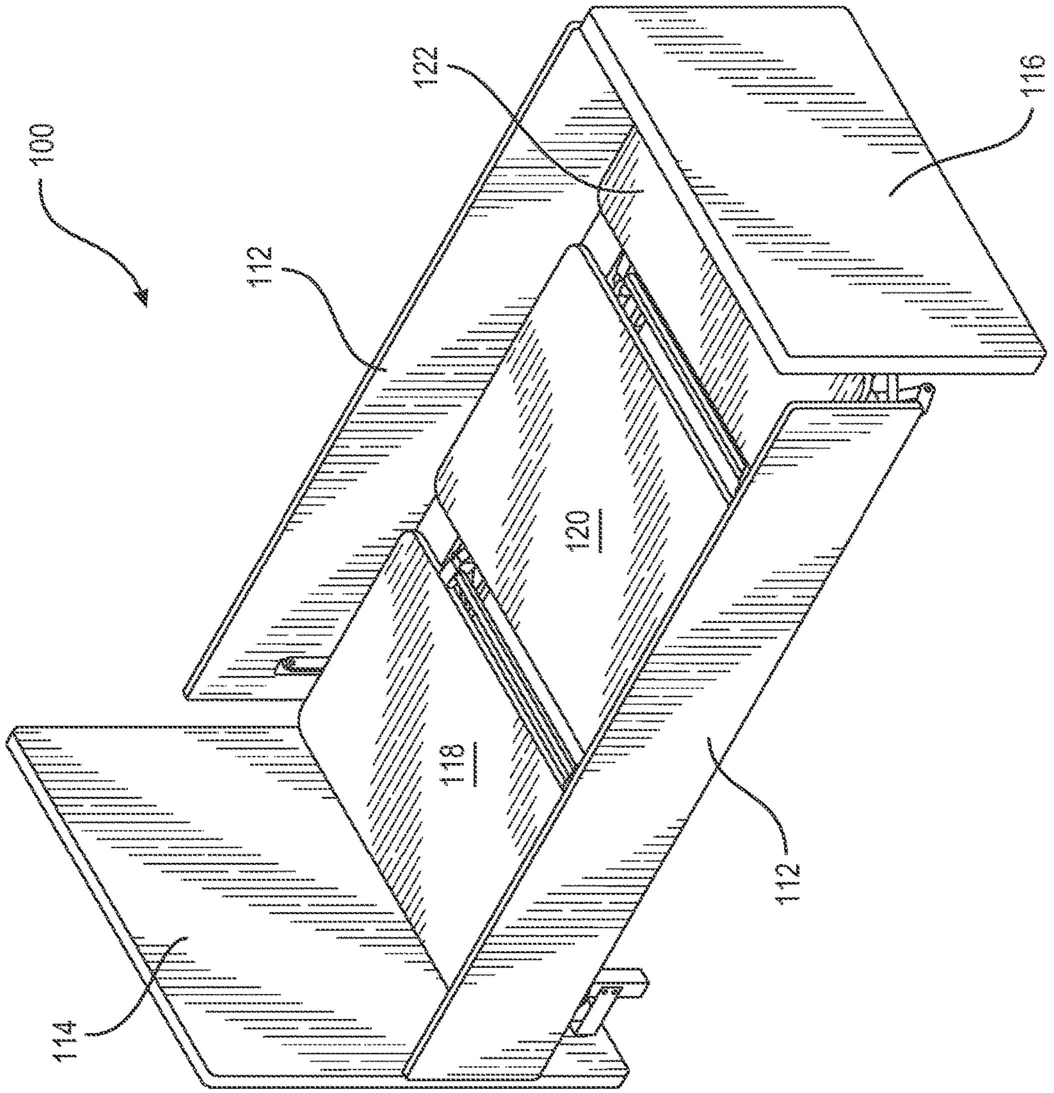
FIG. 2 is a left side perspective view of the new and improved nursing bed as disclosed within FIG. 1 wherein, however, the side rails are disposed at their deployed or raised position.
Figure 8:
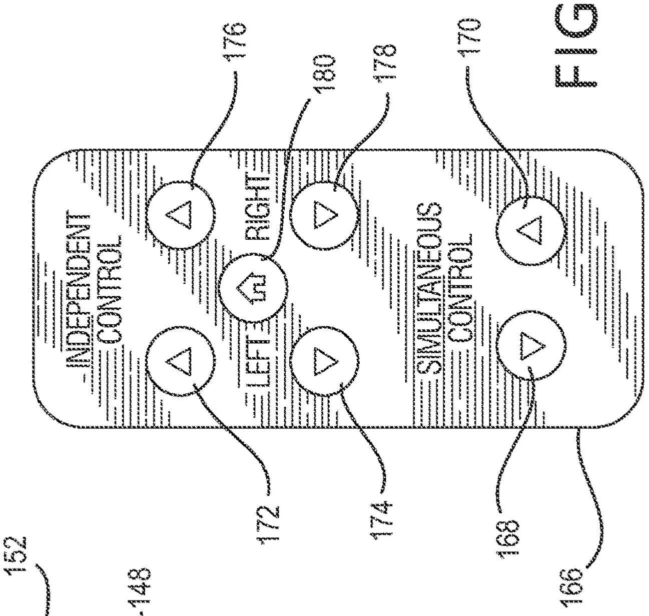
FIG. 8 is a schematic view of a remote control device that may be utilized to control the movements of the side rails of the nursing bed between the deployed or raised positions and the stowed or lowered positions.
Figure 6:
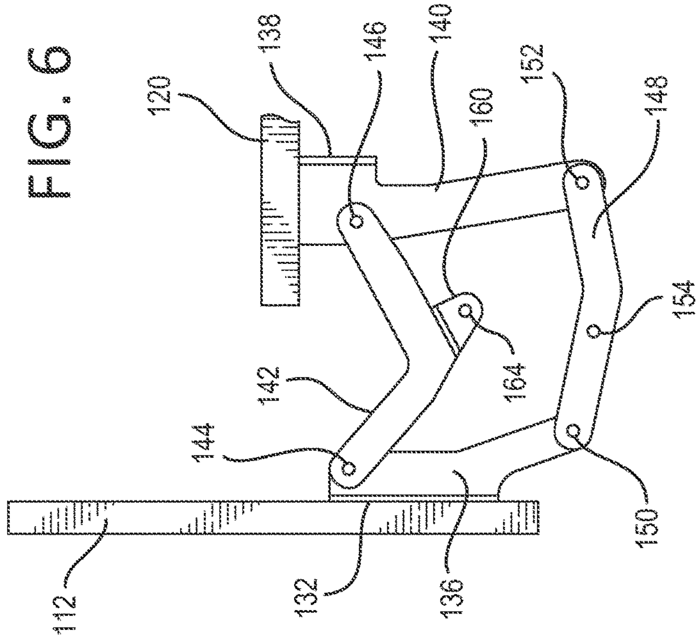
FIG. 6 is an enlarged front elevational view of the left linkage system, as illustrated within FIGS. 4 and 5, showing in detail how the left linkage system is mounted upon the interior surface of the left side rail wherein the left side rail is shown as having been moved to a position intermediate that of the deployed or raised position and the stowed or lowered position, and which corresponds to the position illustrated within FIG. 4.

With reference now being made to FIG. 8, there is schematically illustrated an exemplary remote-control device 166 which may be utilized to control the dispositions of the pair of side rails 112, 112 between their deployed or raised positions as disclosed within FIG. 2, and their stowed or lowered positions as illustrated within FIG. 1, as a result of controlling the motor drives 156, 156 of the pair of linear actuators so as to extend or retract the telescopic rods 158, 158. As has been previously noted, the remote-control device 166 can either be hard-wired to the motor drives 156, 156, or wirelessly connected to the motor drives 156, 156. In either case, it is seen that when the pair of side rails 112, 112 are to be controlled simultaneously, and moved to their stowed or lowered positions, which may be considered to be the default positions, such that the nursing bed 100 will appear as is shown within FIG. 1, then hospital staff or personnel will depress control button 168 which has a "down" arrow marked thereon so that the motor drives 156, 156 of the linear actuators will retract the telescopic rods 158, 158 whereby the pair of side rails will be moved from their deployed or raised positions to their stowed or lowered positions. Conversely, when the pair of side rails 112, 112 are to be controlled simultaneously, and moved to their deployed or raised positions such that the nursing bed 100 will appear as is shown within FIG. 2, then hospital staff or personnel will depress control button 170 which has an "up" arrow marked thereon so that the motor drives 156, 156 of the linear actuators will extend the telescopic rods 158, 158 whereby the pair of side rails will be moved from their stowed or lowered positions to their deployed or raised positions. Different remote-control devices, with different control buttons, can of course be provided.

Having described substantially all of the relevant component parts of the new and improved nursing bed 100 of the present invention, a brief description of the operation of the same will now be described whereby it will be clearly appreciated as to how the side rails 112, 112 are moved between their deployed or raised positions and their stowed or lowered positions when desired or required. As previously noted, FIG. 1 discloses the side rails 112, 112 at their stowed or lowered positions. This disposition of, for example, the left side rail 112, is likewise illustrated within FIG. 5, wherein it is noted that the upper end portion of the side rail 112 is disposed beneath the left edge portion of, for example, the center section 120 of the bed platform 110. Accordingly, when it is desired to move the side rails 112, 112 from their stowed or lowered positions to their deployed or raised positions, such that the side rails 112, 112 will be moved into position near or adjacent to the side edge portions of the bed frame 102 so as to effectively protect bed-ridden patients by preventing them from inadvertently or unintentionally falling out of bed, and as illustrated within FIG. 2, hospital staff or personnel will depress control button 170 upon the remote-control device 166 so as to actuate the linear actuator motor drives 156, 156 whereby the telescopic rods 158, 158 of the linear actuators will be extended. Remembering that the free or distal end portions of the telescopic rods 158, 158 are pivotally connected to the ears 160 of the first linkage members 142, then as the telescopic rods 158, 158 of the linear actuators are extended, such movement will cause the first linkage members 142 to rotationally pivot in a clockwise direction around the pivot points 146 which define their pivotal connections to the upper end portions of the second angle irons 140. Such pivotal movements of the first linkage members 142 then cause the side rails 112, 112 to move outwardly and away from their stowed or lowered positions beneath the side edge portions of the bed platform 120, and to then continue to be elevated toward their deployed or raised positions, as illustrated within FIG. 2, after passing through an intermediate position as illustrated within FIG. 6, the locus of the entire movement of the side rails 112, 112, from their stowed or lowered positions of FIG. 5, through the intermediate positions of FIG. 6, and finally to the deployed or raised positions of FIG. 7, will effectively define a semicircle or a semioval.

It can be further appreciated that as the side rails 112, 112 move outwardly and away from their stowed or lowered positions beneath the side edge portions of the bed platform 120, and begin to move upwardly, the first angle irons 136, which are fixedly mounted upon the interior surfaces of the side rails 112, 112 and are pivotally connected to the second linkage members 148 as at 150, will cause the second linkage members 150 to rotationally pivot in the clockwise direction around the pivot point 152 which define their pivotal connections to the lower end portions of the second angle iron 140. The continuous movement of the side rails 112, 112 is illustrated within FIGS. 5-7, wherein, as illustrated within FIG. 7, the side rails 112, 112 have achieved their deployed or raised positions as is shown within FIG. 2. At these positions, as can best be appreciated from FIG. 7, the interior surface portions of the side rails 112, 112 are disposed adjacent to, but spaced from, a vertical plane effectively defined by the external side edge portions of the bed platform 120, such relatively small spacing or gap being denoted by the letter G in FIG. 7.

It is of course to be appreciated further that when it is desired to move the side rails 112, 112 back to their stowed or lowered positions, hospital staff or personnel will depress control button 168 so as to actuate the motor drives 166, 166 of the linear actuators, whereby the motor drives 166, 166 will retract the telescopic rods 158, 158 such that the side rails will again be moved to their stowed or lowered positions at which the side rails 112, 112 will be stowed beneath the opposite side edge portions of the bed platform 120. The movements of the various components comprising the linkage systems 128, 128 will of course traverse reverse movements similar to those described hereinbefore when the side rails 112, 112 were moved from their stowed or lowered positions to their deployed or raised positions. As a result of the side rails 112, 112 being disposed at their stowed or lowered positions, an esthetically pleasing appearance to the nursing bed is achieved as illustrated within FIG. 2, as well as in fact permitting hospital or other personnel or family members to easily and closely approach a side of the bed, without interference with the side rails 112, 112, so as to thereby easily attend to a particular need of the patient, or to check vital bodily functions of the patient, such as, for example, heart rate, blood pressure, oxygen level, breathing and congestion, and the like.

Figure 9:
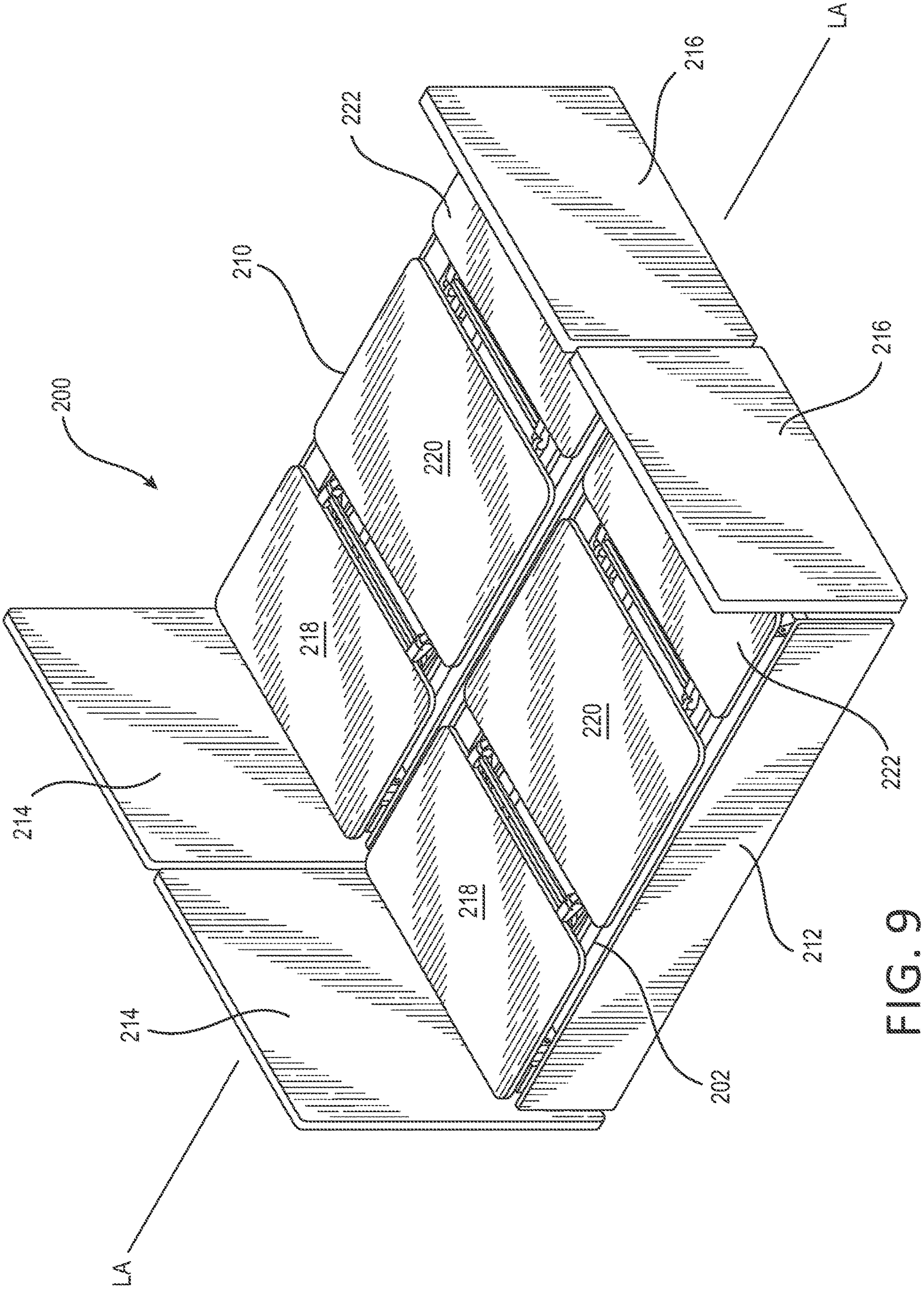
FIG. 9 is a left side perspective view, similar to that of FIG. 1, showing, however, a new and improved nursing bed effectively comprising two nursing beds, as shown within FIG. 1, that have been moved together into abutment with each other such that a patient may be provided with additional room, freedom of movement, and comfort.

Lastly, as can best be seen in FIG. 9, two nursing beds 100, 100 may be disposed in a side-by-side arrangement wherein a left side of one of the nursing beds is disposed in direct contact with a right side of the other one of the nursing beds, as defined along a longitudinally extending central axis LA, so as to effectively define a new combined nursing bed 200. It is to be understood that components of the combined nursing bed 200 which correspond to similar components of the nursing bed 100 will be represented by corresponding reference characters except that they will be within the 200 series. Accordingly, the combined bed 200 as illustrated within FIG. 9 has its external side rails 212 disposed at their stowed or lowered positions. Therefore, the outside or external side rails 212, 212 must be independently actuated so as to be moved between their deployed or raised positions and their stowed or lowered positions, while the internal side rails 212, 212 remain at their stowed or lowered positions beneath the respective side edge portions of the bed platform 220. In this manner, by providing the combined bed 200, comprising two nursing beds 100, 100 that have been disposed in a side-by-side arrangement and in abutment with each other, the patient may effectively be provided with an overall bed that has a width similar to that of a standard queen-sized bed, or that of a standard king-sized bed, as opposed to that of a conventional twin-sized bed, thereby affording the patient more space, more freedom of movement, and more comfort. With reference reverting back to FIG. 8, a brief description of the control of such external side rails of the combined bed 200 will now therefore be provided. It is seen that the remote-control device 166 has been provided with additional actuator control buttons 172, 174, 176, 178, and 180, and that control buttons 172, 174 have been designated LEFT, while control buttons 176, 178 have been designated RIGHT. Accordingly, control buttons 172, 174 control the UP and DOWN movements of the left external side rail 212 of the combined bed 200 by a first respectively independently operated linear actuator motor drive, not shown but similar to actuator motor drive 156, while control buttons 176, 178 control the UP and DOWN movements of the right external side rail 212 of the combined bed 200 by a second respectively independently operated linear actuator motor drive, not shown but similar to actuator motor drive 156. Control button 180 is a HOME button, whereby depression of the same, simultaneously returns both external side rails 212, 212 to their stowed or lowered positions.

Obviously, many variations and modifications of the present invention are possible in light of the above teachings. For example, while the disclosure notes that two pairs of linear actuators, and two pairs of linkage systems, are disposed within the vicinity of both the head and foot ends of the nursing bed, a single pair of linear actuators and a single linkage system may provided at a substantially central portion between the head and foot ends of the nursing bed. It is therefore to be understood that within the scope of the appended claims, the present invention may be practiced otherwise than as specifically described herein.

What is claimed and desired to be protected by Letters Patent, is:

1. A nursing bed, comprising:

a bed frame having a head end, a foot end, and a pair of oppositely disposed side edge members;

a bed platform mounted upon said bed frame and having opposite side edge portions which extend laterally outwardly beyond said opposite side edge members of said bed frame;

a pair of side rails movably mounted upon opposite sides of said bed frame between deployed/raised positions at which said side rails are disposed above said bed frame and said bed platform so as to prevent a person, disposed within said nursing bed, from falling out of said nursing bed, and stowed/lowered positions at which said side rails are stowed beneath said opposite side edge portions of said bed platform;

at least one pair of linkage systems respectively connecting each one of said pair of side rails to a side portion of said bed frame; and at least one pair of actuators for respectively moving said pair of side rails between said deployed/raised positions and said stowed/lowered positions, wherein said at least one pair of actuators are operatively connected to said at least one pair of linkage systems such that when said at least one pair of actuators are actuated so as to move said pair of side rails from said stowed/lowered positions, at which said pair of side rails are disposed beneath said opposite side edge portions of said bed platform, to said deployed/raised positions at which said pair of side rails are disposed above said bed frame and said bed platform so as to prevent a person, disposed within said nursing bed, from falling out of said nursing bed, said pair of side rails will move laterally outwardly, away from said opposite side edge portions of said bed platform and then upwardly toward said deployed/raised positions.

2. The nursing bed as set forth in claim 1, wherein:

said at least one pair of actuators comprise linear actuators.

3. The nursing bed as set forth in claim 1, wherein each one of said at least one pair of linkage systems comprises:

a first mounting plate fixedly secured to one of said side rails;

a second mounting plate fixedly secured to one of said side edge members of said bed frame.

4. The nursing bed as set forth in claim 1, wherein each one of said at least one pair of linkage systems further comprises:

a pair of linkage members pivotally connected to said first and second mounting plates so as to pivotally move said pair of side rails between said deployed/raised positions and said stowed/lowered positions when said at least one pair of actuators are actuated.

5. The nursing bed as set forth in claim 1, wherein:

a locus path, along which said pair of side rails move while being moved by said actuators from said stowed/lowered positions to said deployed/raised positions, comprises a semicircle/semioval.

6. The nursing bed as set forth in claim 1, further comprising:

a remote-control device for controlling said at least one pair of actuators.

7. The nursing bed as set forth in claim 1, wherein:

said at least one pair of actuators and said at least one pair of linkage systems, for respectively moving said pair of side rails between said deployed/raised positions and said stowed/lowered positions, comprises two pairs of actuators and two pairs of linkage systems.

8. The nursing bed as set forth in claim 7, wherein:

said two pairs of actuators and said two pairs of linkage systems are disposed adjacent to said foot end and said head end of said bed frame.

9. A combined nursing bed, comprising:

a pair of nursing beds comprising a pair of bed frames having oppositely disposed side edge members;

a pair of bed platforms respectively mounted upon said pair of bed frames and having opposite side edge portions which extend laterally outwardly beyond said opposite side edge members of said pair of bed frames;

one side of a first one of said pair of bed platforms is disposed adjacent to one side of a second one of said pair of bed platforms such that those sides of said pair of bed platforms that are disposed adjacent to each other are considered to be internal sides of said combined nursing bed, while opposite sides of said pair of bed platforms are considered to be external sides of said combined nursing bed;

a pair of side rails movably mounted upon said opposite external sides of said pair of bed frames between deployed/raised positions at which said side pair of side rails are disposed above said pair of bed frames and said pair of bed platform so as to prevent a person, disposed within said nursing bed, from falling out of said nursing bed, and stowed/lowered positions at which said pair of side rails are stowed beneath said opposite external side edge portions of said pair of bed platforms;

at least one pair of linkage systems respectively connecting each one of said pair of external side rails to external side portions of said bed frames; and at least one pair of actuators for respectively moving said pair of side r rails, mounted upon said external sides of said pair of bed frames, between said deployed/raised positions and said stowed/lowered positions, wherein said at least one pair of actuators are operatively connected to said at least one pair of linkage systems such that when said at least one pair of actuators are actuated so as to move said pair of external side rails from said stowed/lowered positions, at which said pair of external side rails are disposed beneath said opposite side edge portions of said bed platforms, to said deployed/raised positions at which said pair of external side rails are disposed above said pair of bed frames and said pair of bed platforms so as to prevent a person, disposed within said nursing bed, from falling out of said nursing bed, said pair of external side rails will move laterally outwardly, away from said opposite side edge portions of said bed platforms, and then upwardly toward said deployed/raised positions.

10. The combined nursing bed as set forth in claim 9, wherein:

said at least one pair of actuators comprise linear actuators.

11. The combined nursing bed as set forth in claim 9, wherein each one of said at least one pair of linkage systems comprises:

a first mounting plate fixedly secured to one of said side rails;

a second mounting plate fixedly secured to one external side of one said side edge members of one of said pair of bed frames.

12. The combined nursing bed as set forth in claim 9, wherein each one of said at least one pair of linkage systems further comprises:

a pair of linkage members pivotally connected to said first and second mounting plates so as to pivotally move said pair of external side rails between said deployed/raised positions and said stowed/lowered positions when said at least one pair of actuators are actuated.

13. The combined nursing bed as set forth in claim 9, wherein:

the locus path, along which said pair of external side rails move while being moved by said at least one pair of actuators from said stowed/lowered positions to said deployed/raised positions, comprises a semicircle/semioval.

14. The combined nursing bed as set forth in claim 9, further comprising:

a remote-control device for controlling said at least one pair of actuators.

15. The nursing bed as set forth in claim 9, wherein:

said at least one pair of actuators and said at least one pair of linkage systems, for respectively moving said pair of side rails between said deployed/raised positions and said stowed/lowered positions, comprises two pairs of actuators and two pairs of linkage systems.

16. The nursing bed as set forth in claim 15, wherein:

said two pairs of actuators and said two pairs of linkage systems are disposed adjacent to said foot end and said head end of said bed frame.

* * * * *